(12) United States Patent
Gedik et al.

(10) Patent No.: US 8,117,331 B2
(45) Date of Patent: *Feb. 14, 2012

(54) METHOD AND APPARATUS FOR ADAPTIVE LOAD SHEDDING

(75) Inventors: Bugra Gedik, Atlanta, GA (US); Kun-Lung Wu, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 604 days.

This patent is subject to a terminal disclaimer.

(21) Appl. No.: 12/165,524

(22) Filed: Jun. 30, 2008

(65) Prior Publication Data

US 2009/0049187 A1  Feb. 19, 2009

Related U.S. Application Data

(63) Continuation of application No. 11/068,137, filed on Feb. 28, 2005, now Pat. No. 7,610,397.

(51) Int. Cl.
*G06F 15/16* (2006.01)

(52) U.S. Cl. ........ 709/231; 709/234; 707/754; 707/713; 707/636

(58) Field of Classification Search .................. 709/218, 709/223–235, 200; 370/229–235, 546; 705/7–11; 707/634–637, 659–660, 692–693, 713–723, 707/752–754, 764, 769–775; 702/179–190
See application file for complete search history.

(56) References Cited

U.S. PATENT DOCUMENTS

| | | | |
|---|---|---|---|
| 6,823,286 B2 * | 11/2004 | Yuste et al. | 702/179 |
| 6,956,901 B2 | 10/2005 | Boroczky et al. | |
| 7,031,928 B1 * | 4/2006 | Cochran | 705/7 |
| 7,065,517 B1 | 6/2006 | Austin | |
| 7,162,698 B2 | 1/2007 | Huntington et al. | |
| 7,383,253 B1 | 6/2008 | Tsimelzon et al. | |
| 7,493,346 B2 | 2/2009 | Chi et al. | |
| 7,765,221 B2 * | 7/2010 | Zimmerer | 707/756 |
| 7,996,513 B2 * | 8/2011 | Gorman et al. | 709/224 |
| 2003/0236904 A1 | 12/2003 | Walpole et al. | |
| 2004/0062199 A1 | 4/2004 | Lau et al. | |
| 2004/0264377 A1 | 12/2004 | Kilkki et al. | |
| 2008/0306906 A1 | 12/2008 | Zuzarte et al. | |
| 2010/0223268 A1 * | 9/2010 | Papakonstantinou et al. | 707/749 |

OTHER PUBLICATIONS

Kang, et al., "Evaluating Window Joins Over Unbounded Streams," Proceedings of the 28th VLDB Conference—2002.
Srivastava, et al., "Memory-Limited Execution of Windowed Stream Joins," Proceedings of the 30th VLDB Conference—2004.

* cited by examiner

*Primary Examiner* — Greg C Bengzon

(57) ABSTRACT

One embodiment of the present method and apparatus adaptive load shedding includes receiving at least one data stream (comprising a plurality of tuples, or data items) into a first sliding window of memory. A subset of tuples from the received data stream is then selected for processing in accordance with at least one data stream operation, such as a data stream join operation. Tuples that are not selected for processing are ignored. The number of tuples selected and the specific tuples selected depend at least in part on a variety of dynamic parameters, including the rate at which the data stream (and any other processed data streams) is received, time delays associated with the received data stream, a direction of a join operation performed on the data stream and the values of the individual tuples with respect to an expected output.

6 Claims, 8 Drawing Sheets

_US 8,117,331 B2_

METHOD AND APPARATUS FOR ADAPTIVE LOAD SHEDDING

CROSS REFERENCE TO RELATED APPLICATIONS

This application is a continuation of co-pending U.S. patent application Ser. No. 11/068,137, filed Feb. 28, 2005 now U.S. Pat. No. 7,610,397, entitled "METHOD AND APPARATUS FOR ADAPTIVE LOAD SHEDDING", which is herein incorporated by reference in its entirety.

REFERENCE TO GOVERNMENT FUNDING

This invention was made with Government support under Contract No.: H98230-04-3-001 awarded by the U.S. Department of Defense. The Government has certain rights in this invention.

BACKGROUND

The present invention relates generally to data stream processing and relates more particularly to the optimization of data stream operations.

With the proliferation of Internet connections and network-connected sensor devices comes an increasing rate of digital information available from a large number of online sources. These online sources continually generate and provide data (e.g., news items, financial data, sensor readings, Internet transaction records, and the like) to a network in the form of data streams. Data stream processing units are typically implemented in a network to receive or monitor these data streams and process them to produce results in a usable format. For example, a data stream processing unit may be implemented to perform a join operation in which related data items from two or more data streams (e.g., from two or more news sources) are culled and then aggregated or evaluated, for example to produce a list of results or to corroborate each other.

However, the input rates of typical data streams present a challenge. Because data stream processing units have no control over the sometimes sporadic and unpredictable rates at which data streams are input, it is not uncommon for a data stream processing unit to become loaded beyond its capacity, especially during rate spikes. Typical data stream processing units deal with such loading problems by arbitrarily dropping data streams (e.g., declining to receive the data streams). While this does reduce loading, the arbitrary nature of the strategy tends to result in unpredictable and sub-optimal data processing results, because data streams containing useful data may unknowingly be dropped while data streams containing irrelevant data are retained and processed.

Thus, there is a need in the art for a method and apparatus for adaptive load shedding.

SUMMARY OF THE INVENTION

One embodiment of the present method and apparatus adaptive load shedding includes receiving at least one data stream (comprising a plurality of tuples, or data items) in a first sliding window of memory. A subset of tuples from the received data stream is then selected for processing in accordance with at least one data stream operation, such as a data stream join operation. Tuples that are not selected for processing are ignored. The number of tuples selected and the specific tuples selected depend at least in part on a variety of dynamic parameters, including the rate at which the data stream (and any other processed data streams) is received, time delays associated with the received data stream, a direction of a join operation performed on the data stream and the values of the individual tuples with respect to an expected output.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for adaptive load shedding, e.g., for data stream operations. Embodiments of the present invention make it possible for load shedding to be performed in an "intelligent" (e.g., non-arbitrary) manner, thereby maximizing the quality of the data stream operation output (e.g., in terms of a total number of output items generated or in terms of the value of the output generated).

Within the context of the present invention, the term "tuple" may be understood to be a discrete data item within a stream of data (e.g., where the stream of data may comprise multiple tuples).

Figure 1:
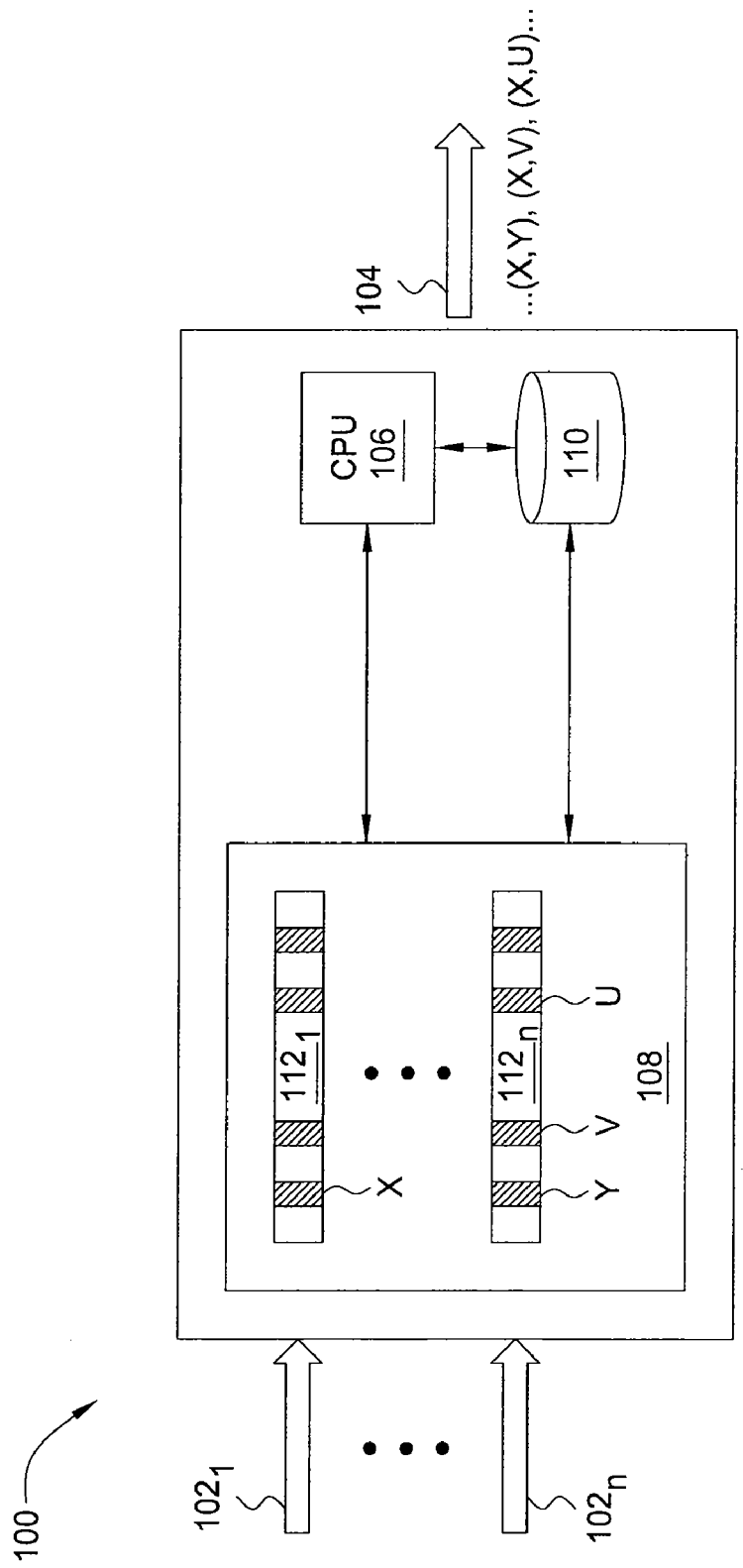
FIG. 1 is a schematic diagram illustrating one embodiment of a data stream processing unit adapted for use with the present invention.

FIG. 1 is a schematic diagram illustrating one embodiment of a data stream processing unit 100 adapted for use with the present invention. The data stream processing unit 100 illustrated in FIG. 1 is configured as a general purpose computing device and is further configured for performing data stream joins. Although the present invention will be described within the exemplary context of data stream joins, those skilled in the art will appreciate that the teachings of the invention described herein may be applied to optimize a variety of data stream operations, including filtering, transforming and the like.

As illustrated, the data stream processing unit 100 is configured to receive two or more input data streams $102_1$-$102_n$ (hereinafter collectively referred to as "input data streams 102"), e.g., from two or more different data sources (not shown), and processes these input data streams 102 to produce a single output data stream 104. The data stream processing unit 100 thus comprises a processor (e.g., a central processing unit or CPU) 106, a memory 108 (such as a random access memory, or RAM) and a storage device 110 (such as a disk drive, an optical disk drive, a floppy disk drive and the like). Those skilled in the art will appreciate that some data stream processing units may be configured to receive only a single input data stream and still be adaptable for use with the present invention.

As each input data stream 102 is received by the data stream processing unit 100, tuples (e.g., discrete data items) from the input data streams 102 are stored in a respective sliding window $112_1$-$112_n$ (hereinafter collectively referred to as "sliding windows 112") in the memory 108. These sliding windows can be user-configurable or system-defined (e.g., based on available memory space) and may be count-based (e.g., configured to store "the last x tuples" of the input data streams) or time-based (e.g., configured to store "the last x seconds" of the input data streams). Thus, as a new tuple from an input data stream 102 arrives in a respective sliding window 112, the new tuple may force an existing tuple to leave the sliding window 112 (if the sliding window 112 was full before receipt of the new tuple). The memory 108 also stores program logic for the adaptive load shedding method of the present invention, as well as logic for other miscellaneous applications. Alternatively, portions of the input data stream and program logic can be stored on the storage medium 110.

To perform a join operation, the processor 106 executes the program logic stored in the memory 108 to process tuples from the input data streams 102 that are stored in the sliding windows 112. Specifically, the join operation is performed by comparing a tuple (e.g., tuple x) from a first sliding window $112_1$ with at least one tuple from at least a second sliding window $112_n$. If one or more tuples from the second sliding window $112_n$ (e.g., tuples y, v, and u) match the join condition for the tuple x, then the matching tuples will be joined such that the output data stream 104 will comprise one or more matched sets of tuples, e.g., (x, y), (x, v) and (x, u).

Thus, the adaptive load shedding method of the present invention may be represented by one or more software application (or even a combination of software and hardware, e.g., using Application Specific Integrated Circuits (ASIC)), where the software is loaded from a storage medium (e.g., storage device 110) and operated by the processor 106 in the memory 108 of the data stream processing unit 100. Thus, in one embodiment, the method for adaptive load shedding described in greater detail below can be stored on a computer readable medium or carrier (e.g., RAM, magnetic or optical driven or diskette, and the like).

Alternatively, the method for adaptive load shedding described in greater detail below can be represented as a discrete load shedding module (e.g., a physical device or subsystem that is coupled to the processor 106 through a communication channel) within the data stream processing unit.

Figure 2:
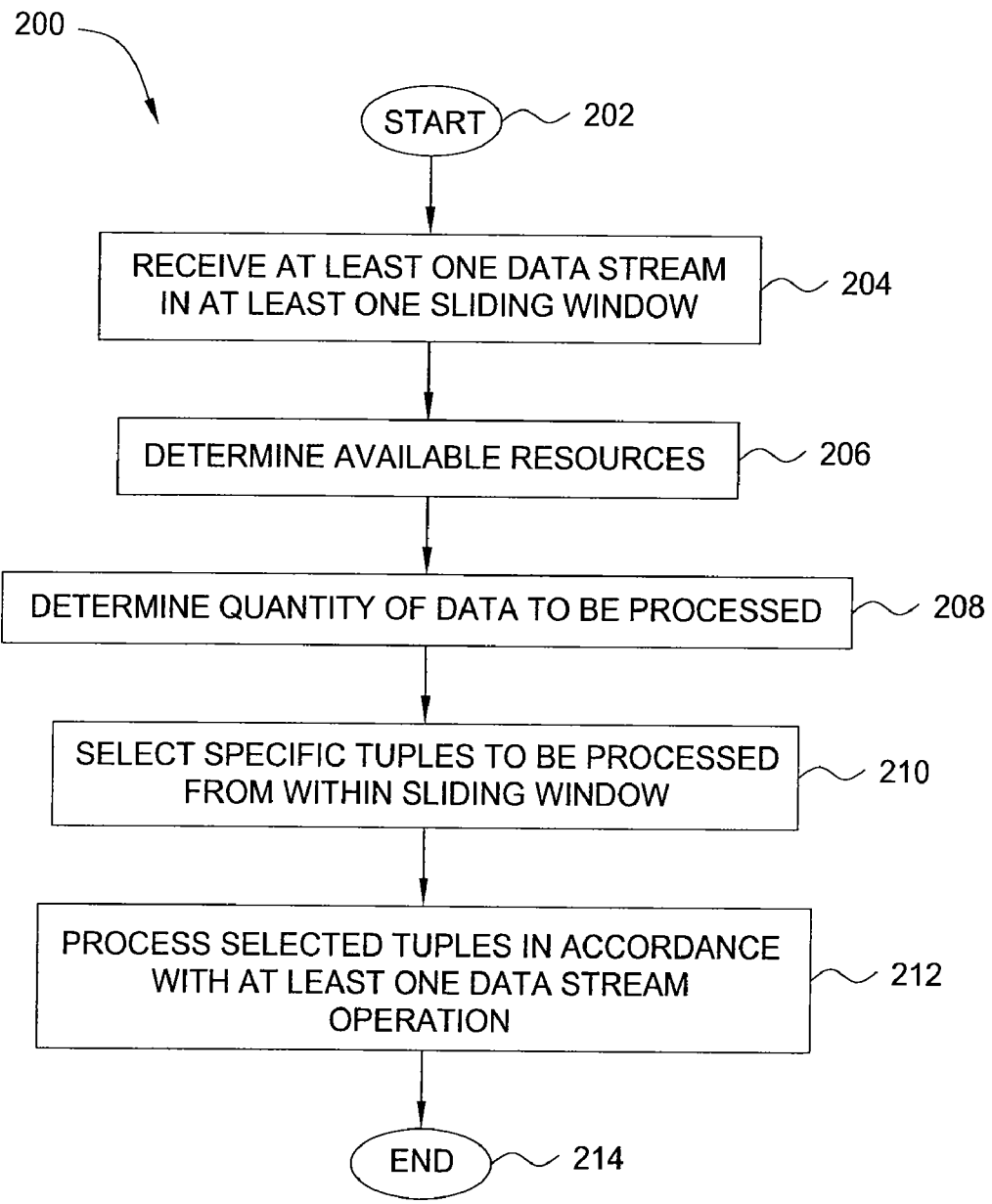
FIG. 2 is a flow diagram illustrating one embodiment of a method for adaptive load shedding for data stream processing according to the present invention.

FIG. 2 is a flow diagram illustrating one embodiment of a method 200 for adaptive load shedding for data stream processing according to the present invention. The method 200 may be implemented at, for example, a data stream processing unit such as the data stream processing unit 100 illustrated in FIG. 1.

The method 200 is initialized at step 202 and proceeds to step 204, where the method 200 receives at least one input data stream. The input data stream is received, for example, within a sliding window of memory as discussed with reference to FIG. 1. The method 200 then proceeds to step 206 and determines what resources are available to process the input data stream.

In step 208, the method 200 determines, based at least in part on the availability of processing resources, the quantity of data (e.g., how many tuples from within the sliding window) that should be processed. In one embodiment, a determination of how much data should be processed is based at least in part on the rate at which the input data stream is currently being received.

The method 200 then proceeds to step 210 and, based on the amount of data to be processed, selects specific tuples from within the sliding window for processing. Thus, the number of tuples selected for processing will not exceed the total amount of data that was identified for processing in step 208. Tuples not selected in step 210 are then shed (e.g., not processed). In one embodiment, selection of specific tuples for processing is based at least in part on at least one of: the values of the tuples (e.g., tuples most closely related to the purpose motivating the data stream processing operation), the time correlation between two or more tuples, and the join direction of the data stream processing application (e.g., where the method 200 is being implemented to shed load for a data stream join).

In step 212, the method 200 processes the selected tuples in accordance with at least one data stream operation (e.g., joining, filtering, transforming and the like). Received tuples that are not selected for processing are ignored, meaning that the un-selected tuples are not immediately processed, but may be processed at a later point in time, e.g., if the processing resources become available and if the un-selected tuples are still present in a sliding window of memory. The method 200 then terminates in step 214.

The method 200 thereby optimizes a data stream operation by intelligently shedding load. Rather than processing every tuple in a sliding window of memory (and shedding load by arbitrarily discarding tuples before they can even enter the sliding window), the method 200 allows all tuples to enter the sliding window and then processes only selected tuples from within the sliding window based on one or more stated parameters and on resource availability. Thus all data provided to the method 200 remains available for processing, but only a tailored subset of this available data is actually processed. Thus, the method 200 maximizes the quality of the data stream operation output for a given set of available processing resources.

Figure 3:
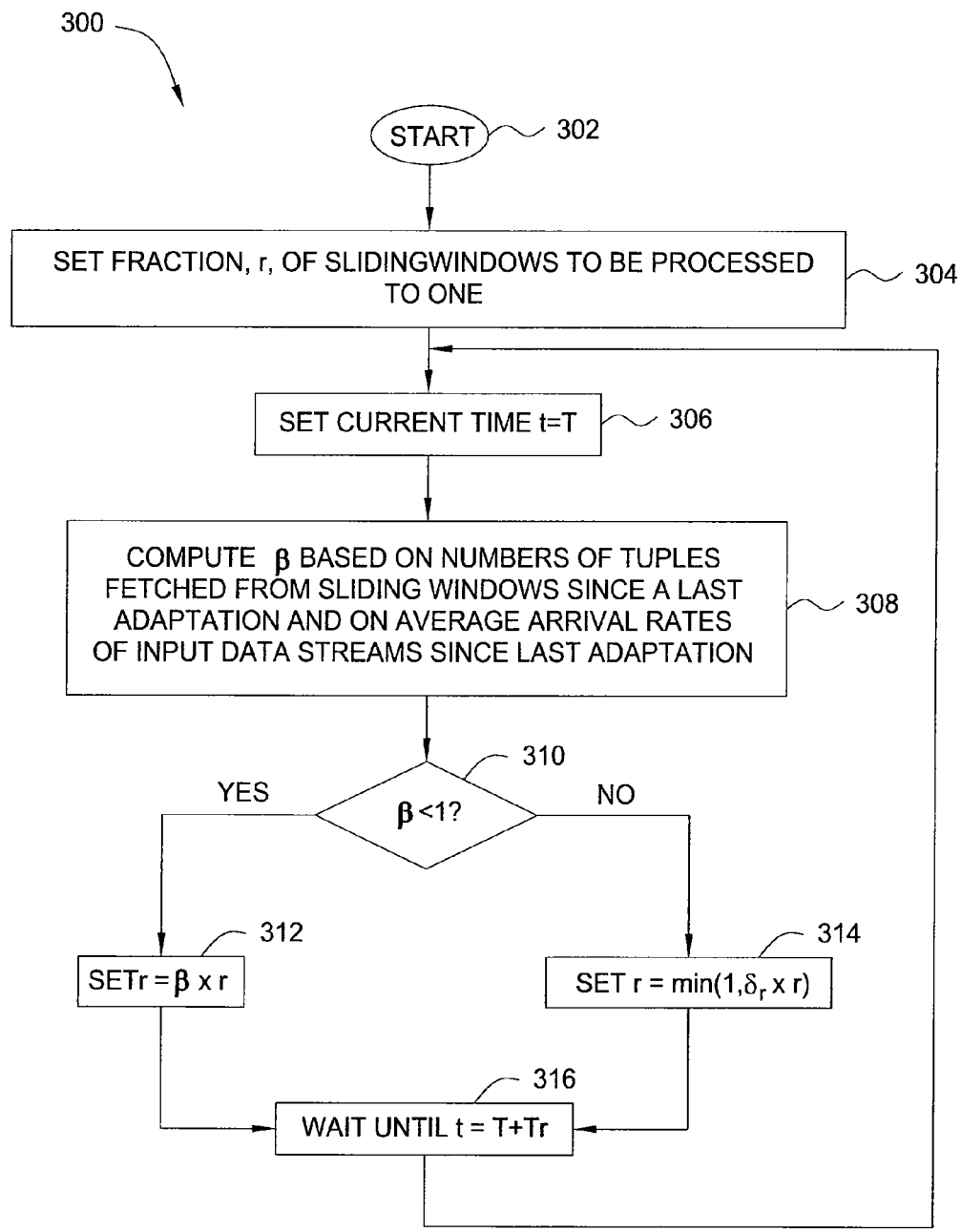
FIG. 3 is a flow diagram illustrating one embodiment of a method for determining the quantity of data to be processed, in accordance with the method illustrated in FIG. 2.

FIG. 3 is a flow diagram illustrating one embodiment of a method 300 for determining the quantity of data (e.g., number of tuples) to be processed, e.g., in accordance with step 208 of the method 200. The method 300 enables the quantity of data that is selected for processing to be adjusted according to the rate at which new data is being received (e.g., the rates at which input data streams are arriving), thereby facilitating efficient use of processing resources.

The method 300 is initialized at step 302 and proceeds to step 304, where the method 300 sets a fraction, r, of the data in each sliding window to be processed to a default value. In one embodiment, the default value is either one or zero, with a default value of one implying an assumption that a stream join operation can be performed fully without any knowledge of data streams yet to be received. In one embodiment, this fraction, r, is applied to all sliding windows containing available tuples for processing.

At substantially the same time that the value for r is set, the method 300 proceeds to step 306 and sets the time, t, to T. The method 300 then proceeds to step 308 and calculates an adaptation factor, $\beta$, where $\beta$ is based on the numbers of tuples fetched from the sliding windows since a last execution of the method 300 and on the arrival rates of the input data streams in the sliding windows since the last execution of the method 300. In one embodiment, $\beta$ is calculated as:

$$\beta = \frac{\alpha_1 + \ldots + \alpha_n}{(\lambda_1 + \ldots + \lambda_n)T_r} \quad \text{(EQN. 1)}$$

where $\alpha_{1-n}$ is a number of tuples fetched from a designated sliding window (e.g., where n sliding windows are being processed) since the last execution of the method 300, $\lambda_{1-n}$ is the average arrival rate of an input data stream in a designated sliding window since the last execution of the method 300, and $T_r$ is the adaptation period (e.g., such that the method 300 is configured to execute every $T_r$ seconds). In one embodiment, the size of the adaptation period $T_r$ is selected to be adaptive to "bursty" or sporadic data input rates. In one embodiment, $T_r$ is approximately 5 seconds.

Once the adaptation factor $\beta$ is calculated, the method 300 proceeds to step 310 and determines whether $\beta$ is less than one. If the method 300 concludes that $\beta$ is less than one, the method 300 proceeds to step 312 and re-sets r to $\beta*r$, which effectively results in smaller fractions of the sliding windows being selected for processing. Alternatively, if the method 300 concludes that $\beta$ is greater than or equal to one, the method 300 proceeds to step 314 and re-sets r to the smaller value of one and $\delta_r*r$, which effectively results in larger fractions of the sliding windows being selected for processing. In this case, $\delta_r$ is a fraction boost factor. In one embodiment, the fraction boost factor $\delta_r$ is predefined by a user or by the data stream processing unit. In one embodiment, the fraction boost factor $\delta_r$ is approximately 1.2. Those skilled in the art will appreciate that selecting higher values for the fraction boost factor $\delta_r$ will result in a more aggressive increase of the fraction, r.

Once the value of r has been appropriately re-set, the method 300 proceeds to step 316 and waits for the time t to equal $T+T_r$. That is, the method 300 waits for the start of the next adaptation period. Once $t=T+T_r$, the method 300 returns to step 306 and proceeds as described above so that the fractions r of the sliding windows that are selected for processing continually adapt to the arrival rates of the input data streams. In this manner, load shedding can be adapted based on available processing resources even when the arrival rates of input data streams are sporadic or unpredictable.

Once the amount of data to be processed is determined, specific tuples may be selected for processing from within each sliding window. One method in which tuples may be selected for processing adapts the selection process according to temporal correlations between tuples by prioritizing tuples according to the times in which the tuples were generated or entered the sliding windows.

Figure 4:
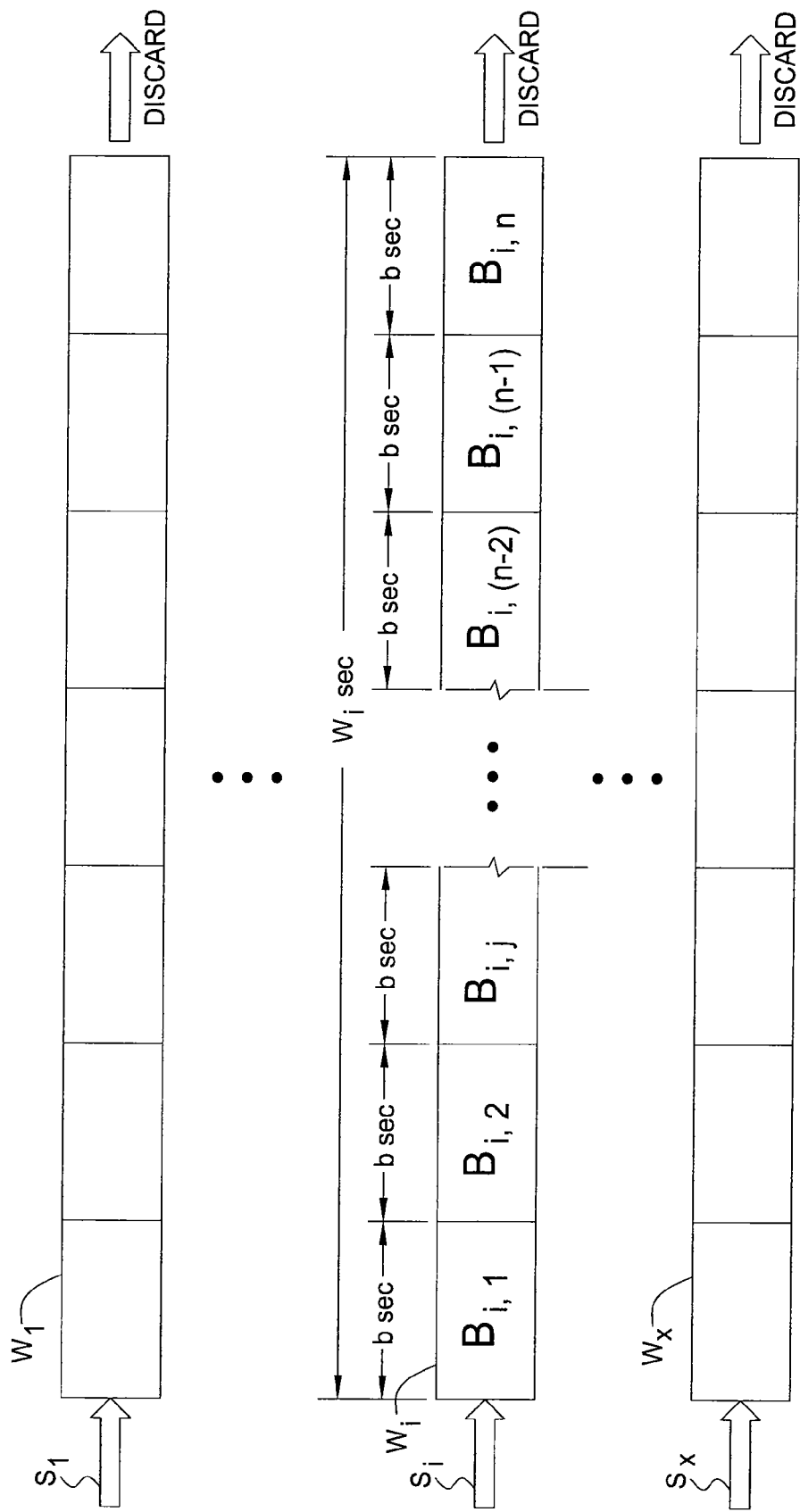
FIG. 4 is a schematic diagram illustrating the basis for one embodiment of an adaptive tuple selection method based on time correlation.

FIG. 4 is a schematic diagram illustrating the basis for one embodiment of an adaptive tuple selection method based on time correlation. Consider a data stream processing unit that is configured to receive x input data streams $S_1$-$S_x$ in x respective sliding windows $W_1$-$W_x$. Sliding window $S_i$, where $i \in [1, \ldots, x]$, is a representative sliding window. Sliding window $S_i$ contains a total of $w_i$ seconds worth of tuples and is divided into n sub-windows $B_{i,1}$-$B_{i,n}$ each containing b seconds worth of tuples (i.e., such that $n=1+[w_i/b]$).

Those skilled in the art will appreciate that the size, b, of each sub-window is subject to certain considerations. For example, smaller sub-windows are better for capturing the peak of a match probability distribution, but because there is a larger number of sub-windows, more processing capacity is needed. On the other hand, larger sub-windows are less costly from a processing standpoint, but are less adaptive to the dynamic natures of the input data streams.

New tuples enter the sliding window $S_i$ at a first sub-window $B_{i,1}$ and continue to enter the first sub-window $B_{i,1}$ until the most recent tuple to enter the first sub-window $B_{i,1}$ has a timestamp that is b seconds longer than the timestamp of the first tuple to enter first sub-window $B_{i,1}$. At this point, all tuples residing in the last sub-window $B_{i,n}$ are discarded, and all sub-windows shift over by one position (i.e., so that the last sub-window $B_{i,n}$ becomes the first sub-window, the first sub-window $B_{i,1}$ becomes the second sub-window, and so on). Thus, the sliding window $W_i$ is maintained as a circular buffer, and tuples do not move from one sub-window to another, but remain in a single sub-window until that sub-window is emptied and shifts to the position of the first sub-window $B_{i,1}$.

As will be discussed in greater detail below, one embodiment of an adaptive tuple selection method based on time correlation establishes a time correlation period, $T_c$, where the method executes once every $T_c$ seconds to adapt the manner in which specific tuples are selected based on time correlation between incoming tuples. In the case where the tuple selection method is implemented in conjunction with a data stream join operation, one of two tuple processing methods may be performed between two consecutive executions of the tuple selection method. These two tuple processing methods are referred to as full processing and selective processing. Full processing involves comparing a newly input tuple from a first sliding window against all tuples in at least a second sliding window. Selective processing involves comparing a newly input tuple from a first sliding window against tuples contained only in high-priority sub-windows of at least a second sliding window. As will be described in greater detail below, in one embodiment sub-windows are prioritized based on a number of output tuples expected to be produced by comparing the newly input tuple from the first sliding window against tuples in each sub-window of the second sliding window.

Whether a newly input tuple is subjected to full or selective processing is dictated by the tuple's respective sampling probability, $\gamma$. The probability of a newly input tuple being subjected to full processing is $r*\gamma$; conversely, the probability of the same newly input tuple being subjected to selective processing is $1-r*\gamma$. Thus, the fraction, r, that is determined by the method 300 is used to scale the sampling probability $\gamma$ so that full processing will not consume all processing resources during periods of heavy loading. In one embodiment, the sampling probability $\gamma$ is predefined by a user or by the data stream processing unit. The value of the sampling probability $\gamma$ should be small enough to avoid undermining selective processing, but large enough to be able to capture a match probability distribution. In one embodiment, the sampling probability $\gamma$ is set to approximately 0.1.

Full processing facilitates the collection of statistics that indicate the "usefulness" of the first sliding window's sub-windows for the data stream join operation. In one embodiment, full processing calculates, for each sub-window $B_{i,j}$, a number of expected output tuples produced by comparing a newly input tuple with a tuple from the sub-window $B_{i,j}$. This number of expected output tuples may be referred to as $o_{i,j}$. Specifically, during full processing, for each match found with a tuple in the sub-window $B_{i,j}$, a counter $ô_{i,j}$ is incremented. The $ô_{i,j}$ values are later normalized (e.g., by $\gamma*r*b*\lambda_1* \ldots *\lambda_n*T_c$) to calculate the number of expected output tuples $o_{i,j}$.

Figure 5:
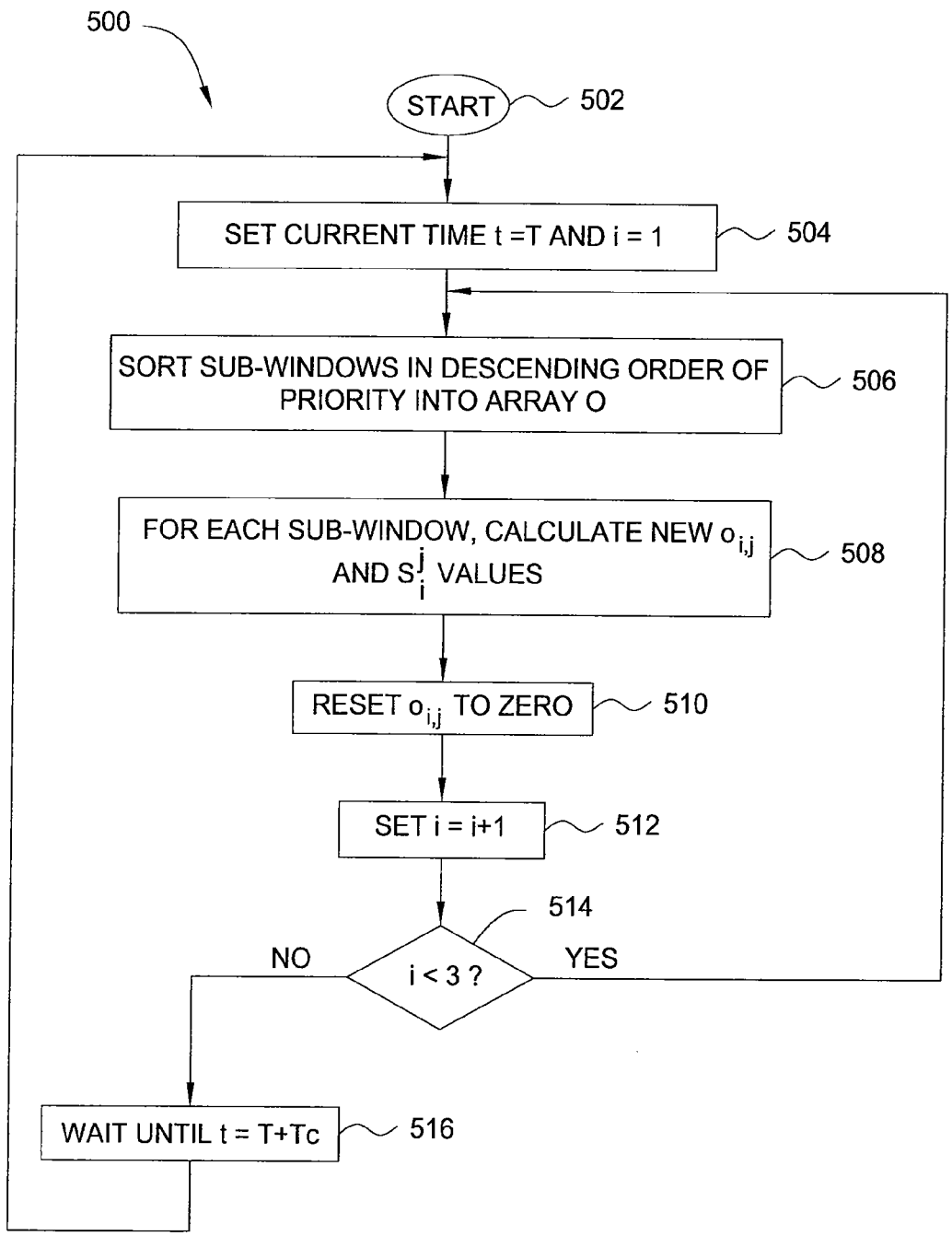
FIG. 5 is a flow diagram illustrating one embodiment of a method for prioritizing sub-windows of a given sliding window for use in tuple selection, in accordance with the method illustrated in FIG. 2.

FIG. 5 is a flow diagram illustrating one embodiment of a method 500 for prioritizing sub-windows of a given sliding window for use in tuple selection, e.g., in accordance with step 210 of the method 200. Specifically, the method 500 enables sub-windows of a sliding window to be sorted based on time delays (e.g., application dependent or communication related) between matching tuples in the sliding window and tuples to be compared there against, thereby facilitating the selection of the most relevant tuples for processing.

The method 500 is initialized at step 502 and proceeds to step 504, where the method 500 sets the current time, t, to T and sets i to one, where i identifies a sliding window to be examined (e.g., sliding window $W_i$ of FIG. 4). The method 500 then proceeds to step 506 and sorts the sub-windows of the selected sliding window into an array, O. Specifically, the sub-windows are sorted in descending order based on their respective numbers of expected output tuples (un-normalized), $ô_{i,j}$, such that $\{ô_{i,j}|j\epsilon[1, \ldots, n]\}$.

The method 500 then proceeds to step 508 and, for each sub-window, $B_{i,j}$, (where $j\epsilon[1, \ldots, n]$), calculates new values for the respective numbers of expected output tuples, $o_{i,j}$, and $s_i^j$. In this case, $s_i^j=k$ means that the $j^{th}$ item in the sorted list $\{o_{i,l}|l\epsilon[1, \ldots, n]\}$ is $o_{i,k}$, where the list $\{o_{i,l}|l\epsilon[1, \ldots, n]\}$ is sorted in descending order. In one embodiment, the new value for $o_{i,j}$ is calculated as:

$$o_{i,j} = \frac{ô_{i,j}}{\gamma*r*b*\lambda_i*\sum_{j\neq i}\lambda_j*T_c} \quad \text{(EQN. 2)}$$

and $s_i^j=k$, where $O[j]=ô_{i,j}$.

In step 510, the method 500 then resets all $ô_{i,j}$ values to zero. The method 500 then proceeds to step 512 and sets i to i+1, e.g., so that the method 500 focuses on the next sliding window to be examined. Thus, the method 500 inquires, at step 514, if i is now less than 3. If the method 500 determines that i is less than three, the method 500 returns to step 506 and proceeds as described above, e.g., in order to analyze the sub-windows of the next sliding window to be examined.

Alternatively, if the method 500 determines in step 514 that i is not less than three, the method 500 proceeds to step 516 and waits until the time, t, is $T+T_c$. That is, the method 500 waits for the start of the next time correlation adaptation period. Once the next time correlation adaptation period starts, the method 500 returns to step 504 and proceeds as described above so that the $o_{i,j}$ and $s_i^j$ values of each sub-window under examination continually adapt to the temporal correlations between the incoming data streams.

Figure 6:
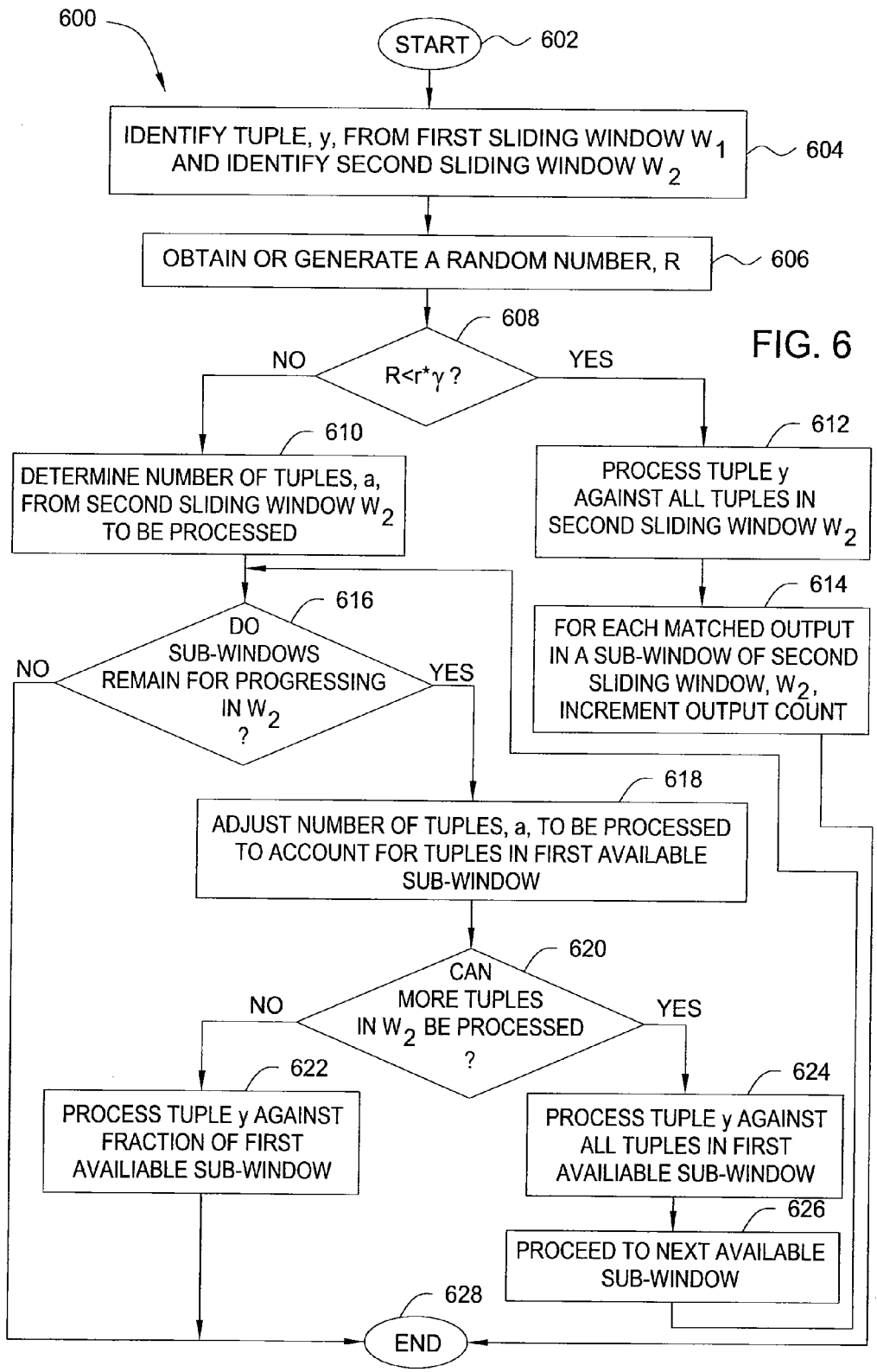
FIG. 6 is a flow diagram illustrating one embodiment of a method for selecting tuples for processing, in accordance with the method illustrated in FIG. 2.

FIG. 6 is a flow diagram illustrating one embodiment of a method 600 for selecting tuples for processing, e.g., in accordance with step 212 of the method 200. Specifically, the method 600 processes a given tuple, y, from a first sliding window $W_1$ against one or more selected tuples in a second sliding window $W_2$. As will be described in further detail below, the method 600 exploits knowledge gained from the method 500 regarding the prioritizing of sub-windows within the second sliding window $W_2$.

The method 600 is initialized at step 602 and proceeds to step 604, where the method 600 identifies the tuple, y, for processing from the first sliding window $W_1$. In one embodiment, the identified tuple, y, is a newly received tuple. The method 600 also identifies the second window $W_2$ against which to process the identified tuple y, e.g., in accordance with a data stream join operation.

In step 606, the method 600 obtains or generates a random number R. The method 600 then proceeds to step 608 and inquires if R is less than $r*\gamma$. If the method 600 determines that R is less than $r*\gamma$, the method 600 proceeds to step 612 and commences full processing on the tuple y from the first window $W_1$.

Specifically, in step 612, the method 600 processes the tuple y from the first sliding window $W_1$ against all tuples in the second sliding window $W_2$ in accordance with at least one data stream operation (e.g., a join). The method 600 then proceeds to step 614 and, for each matched output in each sub-window of the second sliding window $W_2$, increments the sub-window's un-normalized output count $ô_{i,j}$ (e.g., by one). The method 600 then terminates in step 628.

Alternatively, if the method 600 determines in step 608 that R is not less than $r*\gamma$, the method 600 proceeds to step 610 and commences selective processing on the tuple y from the first sliding window $W_1$. Specifically, in step 610, the method 600 determines the number of tuples to be processed from the second sliding window $W_2$. In one embodiment, the number of tuples to be processed, $\alpha$, is calculated as:

$$\alpha = r*|W_1| \quad \text{(EQN. 3)}$$

where $|W_1|$ is the size of the first sliding window $W_1$ (e.g., as measured in terms of a number of tuples or a duration of time contained within the first sliding window $W_1$).

The method 600 then proceeds to step 616 and starts to processes the tuple y from the first window $W_1$ against tuples in the second sliding window $W_2$, starting with the highest priority sub-window in the second sliding window $W_2$ (e.g., $B_{i, s_i^j}$) and working through the remaining sub-windows in descending order of priority until the tuple y from the first sliding window $W_1$ has been processed against a tuples from the second sliding window $W_2$. Specifically, in step 616, the method 600 inquires whether any sub-windows remain for processing in the second sliding window $W_2$ (e.g., whether the current sub-window is the last sub-window). If the method 600 concludes that no sub-windows remain for processing in the second sliding window $W_2$, the method 600 terminates in step 628.

Alternatively, if the method 600 concludes in step 616 that there are sub-windows that are available for processing in the second sliding window $W_2$, the method 600 proceeds to step 618 and adjusts the number of tuples available for processing in the second sliding window $W_2$ to account for the tuples contained in the first available sub-window (e.g., the highest-priority available sub-window, $B_{i, s_i^j}$). That is, the method 600 subtracts the number of tuples in the first available sub-window from the total number of tuples, $\alpha$, to be selected for processing from the second sliding window $W_2$ (e.g., such that the new value for $\alpha=\alpha-|B_{i, s_i^j}|$). Thus, $\alpha-|B_{i, s_i^j}|$ more tuples from the second sliding window $W_2$ may still be processed against the tuple y from the first sliding window $W_1$.

The method 600 then proceeds to step 620 and inquires whether any more tuples from the second sliding window $W_2$ are available for processing (e.g., whether the adjusted $\alpha>0$). If the method 600 concludes that a number of tuples in the second sliding window $W_2$ can still be processed, the method 600 proceeds to step 624 and processes the tuple y from the first sliding window $W_1$ against all tuples in the first available sub-window $B_{i, s_j{}^j}$ of the second sliding window $W_2$. The method 600 then proceeds to step 626 and proceeds to the next available (e.g., next-highest priority) sub-window in the second sliding window $W_2$. The method 600 then returns to step 616 and proceeds as described above in order to determine how many tuples from the next available sub-window can be used for processing.

Alternatively, if the method 600 concludes in step 620 that no more tuples can be processed from the second sliding window $W_2$ (e.g., that the adjusted α is <0), the method 600 proceeds to step 622 and processes the tuple y from the first sliding window $W_1$ against a fraction of the tuples contained within the first available sub-window $B_{i, s_j{}^j}$. In one embodiment, this fraction, $r_e$, is calculated as:

$$r_e = 1 + \frac{a}{|B_{i,s_i^j}|} \qquad \text{(EQN. 4)}$$

where $r_e$ is a fraction with a value in the range of zero to one. Once the tuple y from the first sliding window $W_1$ has been processed against the fraction $r_e$ of the first available sub-window $B_{i, s_j{}^j}$, the method 600 terminates in step 628.

In yet another embodiment, once the amount of data to be processed is determined, specific tuples may be selected for processing from within each sliding window based on the join direction of a data stream join operation. The "direction" of a data stream join operation is defined by the numbers of tuples that are processed from each input data stream (e.g., if more tuples are being processed from a first data stream $S_1$ than a second data stream, $S_2$, the join is in the direction of the second data stream $S_2$). Because of the time delay difference between data streams, one direction of a data stream join operation may be more valuable than the opposite direction. For example, comparing a single tuple from the first data stream $S_1$ against many tuples from a second data stream $S_2$ may produce more usable output than the converse operation. Thus, in this case, load shedding should be performed in the converse direction (e.g., more tuples should be shed from the first sliding window $W_1$ than the second sliding window $W_2$).

Figure 7:
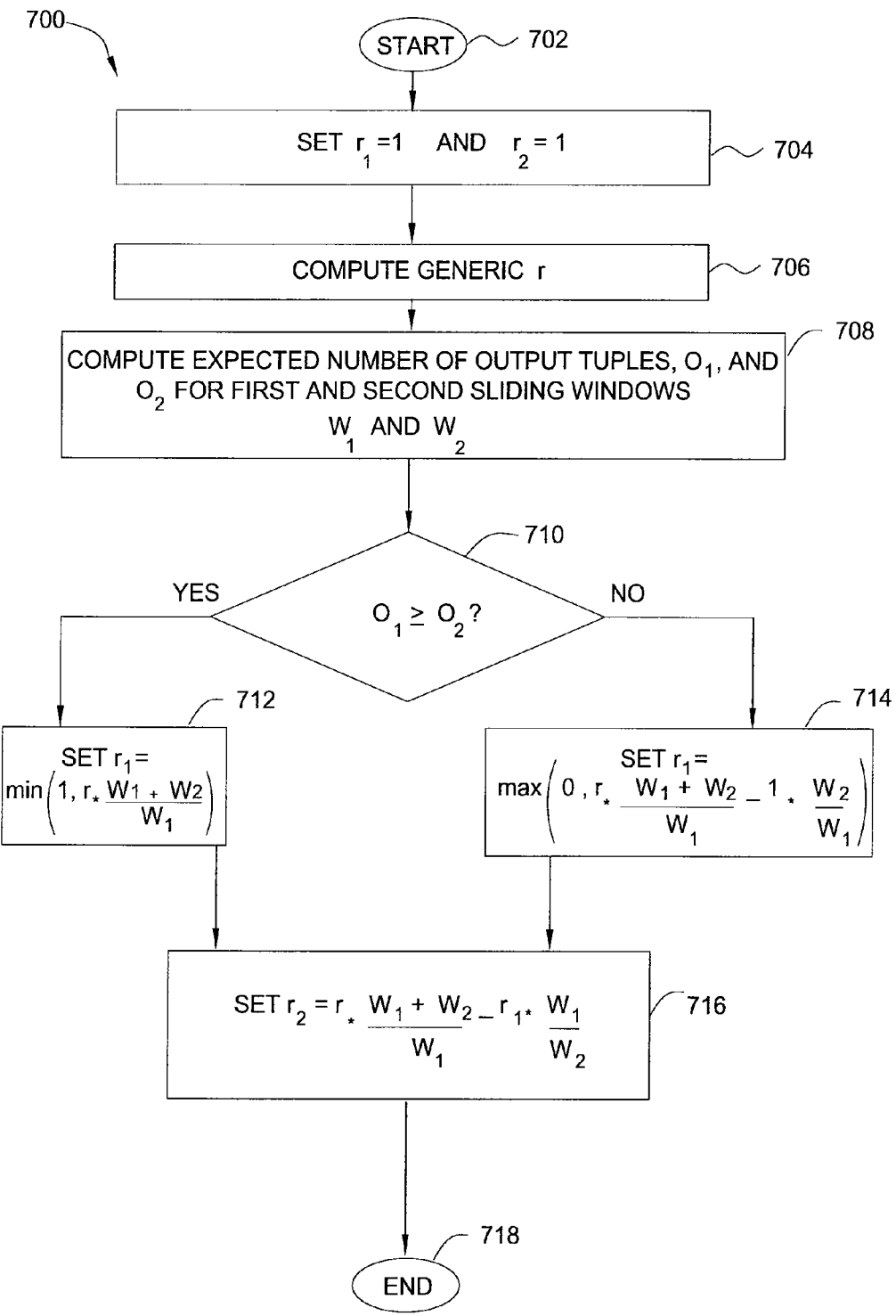
FIG. 7 is a flow diagram illustrating another embodiment of a method for selecting tuples for processing, in accordance with the method illustrated in FIG. 2.

FIG. 7 is a flow diagram illustrating one embodiment of a method 700 for selecting tuples for processing, e.g., in accordance with step 212 of the method 200. Specifically, the method 700 determines the individual fractions, $r_1$ and $r_2$, that should be applied, respectively, to process a fraction of the tuples in first and second sliding windows $W_1$ and $W_2$. This optimizes the direction of the join operation in order to maximize output.

The method 700 is initialized at step 702 and proceeds to step 704, where the method 700 sets the fraction $r_1$ of the first sliding window $W_1$ to be processed to one. The method 700 also sets the fraction $r_2$ of the second sliding window $W_2$ to be processed to one. The method 700 then proceeds to step 706 and computes a generic r value, e.g., in accordance with the method 300.

In step 708, the method 700 computes the expected numbers of output tuples $o_1$ and $O_2$ to be produced, respectively, by the first and second sliding windows $W_1$ and $W_2$. In one embodiment, the values for $o_1$ and $o_2$ calculated as:

$$o_i = \frac{1}{n_i} * \sum_{j=1}^{n_i} o_{i,j} \qquad \text{(EQN. 5)}$$

where i indicates the specific sliding window $W_1$ or $W_2$ for which the expected number of output tuples is being calculated (e.g., i being 1 or 2 in this example), $n_i$ is the total number of sub-windows in the sliding window (e.g., $W_1$ or $W_2$) under consideration, and j indicating any sub-window 1-n within the sliding window $W_1$ or $W_2$ under consideration.

Once the expected numbers of output tuples $o_1$ and $o_2$ are calculated for each sliding window $W_1$ and $W_2$, the method 700 proceeds to step 710 and inquires if $o_1 \geq o_2$. If the method 700 determines that $o_1$ is greater than or equal to $o_2$, the method 700 proceeds to step 712 and re-sets $r_1$ to the smaller of one and $$r * \frac{w_1 + w_2}{w_1}.$$

Alternatively, if the method 700 determines in step 710 that $o_1$ is not greater than or equal to $o_2$, the method 700 proceeds to step 714 and re-sets $r_1$ to the larger of zero and $$r * \frac{w_1 + w_2}{w_1} - 1 * \frac{w_2}{w_1}.$$

In step 716, once the new value for $r_1$ has been computed, the method 700 calculates a new value for $r_2$. In one embodiment, $r_2$ is calculated as:

$$r_2 = r * \frac{w_1 + w_2}{w_1} - r_1 * \frac{w_1}{w_2} \qquad \text{(EQN. 6)}$$

$$\text{such that } r * (w_1 + w_2) = r_1 * w_1 + r_2 * w_2 \qquad \text{(EQN. 7)}$$

the method 700 then terminates in step 718.

As described herein, the methods 500, 600 and 700 are aimed at maximizing the number of output tuples, $o_{i,j}$, generated by a data stream processing operation given limited processing resources. However, for some data stream processing operations, it may be desirable to maximize not just the quantity, but the value of the output data. Thus, in one embodiment, each tuple received via an input data stream is associated with an importance value, which is defined by the type of tuple and specified by a utility value attached to that type of tuple.

In one embodiment, the type of a tuple, y, is defined as $Z(y)=z \epsilon Z$. The utility value of the same tuple, y, is thus defined as $V(Z(y))=V(z)$. In one embodiment, type and utility value parameters are set based on application needs. For example, in news matching applications (e.g., where tuples representing news items from two or more different sources are matched), tuples representing news items can be assigned utility values from the domain [1, . . . , 10], where a value of 10 is assigned to the tuples representing the most important news items. Moreover, the frequency of appearance of a tuple of type z in an input data stream $S_i$ is denoted as $f_{i,z}$.

Thus, in one embodiment, load shedding may be performed in a manner that sheds a proportionally smaller number of tuples of types that provide higher output utilities. The extra processing resources that are allocated to process these high-output utility tuple types are balanced by shedding a proportionally larger number of tuple types having low output utilities. This can be accomplished by applying different processing fractions, $r_{i,z}$, to different types of tuples, based on the output utilities of those types of tuples. In one embodiment, the expected output utility obtained from comparing a tuple y of type z from a first sliding window $W_1$ with a tuple in a second sliding window $W_2$ is denoted as $u_{i,z}$ and is used to determine $r_{i,z}$ values.

The computation of $r_{i,z}$ can be formulated as a fractional knapsack problem having a greedy optimal solution. For example, consider $I_{i,j,z}$ as an item that represents the processing of a tuple y of type z (from the first sliding window $W_1$) against sub-window $B_{i,j}$ of the second sliding window $W_2$. Item $I_{i,j,z}$ has a volume of $\lambda_1 * \lambda_2 * w_{i,z} * b$ units and a value of $\lambda_1 * \lambda_2 * w_{i,z} * u_{i,z} * b * p_{i,s_i^j}$ units, where $p_{i,j}$ denotes the probability of a match for sub-window $B_{i,j}$. Thus, the goal is to select a maximum number of items, where fractional items are acceptable, so that the total value is maximized and the total volume of the selected items is at most $\lambda_1 * \lambda_2 * r * (w_1 + w_2)$. Here, $r_{i,j,z} \in [0, \ldots, 1]$ is used to denote how much of item $I_{i,j,z}$ is selected. Those skilled in the art will appreciate that the number of unknown variables (e.g., $r_{i,j,z}$'s) can be calculated as $(B_{1,n} + B_{2,n}) * |Z|$, and the solution of the original problem (e.g., determining a value for $r_{i,z}$) can be calculated from these variables as:

$$r_{i,z} = \sum_{j \in [1, \ldots, n]} ri, j, z \qquad \text{(EQN. 7)}$$

In one embodiment, the values of the fraction variables (e.g., $r_{i,j,z}$'s) are determined during a join direction adaptation (e.g., as described in the method 700). In one embodiment, a simple way to do this is to sort the items $I_{i,j,z}$ based on their respective value over volume ratios, $u_{i,z} * p_{i,s_i^j}$, and to select as much as possible of the item $I_{i,j,z}$ that is most valuable per unit volume. However, since the total number of items $I_{i,j,z}$ may be large, this sorting can be costly in terms of processing resources, especially for a large number of sub-windows and larger sized tuple types.

Thus, in another embodiment, use is made of the $s_i^j$ values that define an order between value over volume ratios of items $I_{i,j,z}$ for a fixed type z and sliding window $W_i$. Items $I_{i,j,z}$ representing different data streams S and different types z with the highest value over volume ratios are maintained in a heap H. An item $I_{i,j,z}$ is iteratively selected from the heap H and replaced with an item $I_{i,j,z}$ having the next highest value over volume ratio with the same data stream and same type subscript index. This iterative process repeats until a capacity constraint is reached.

Figure 8:
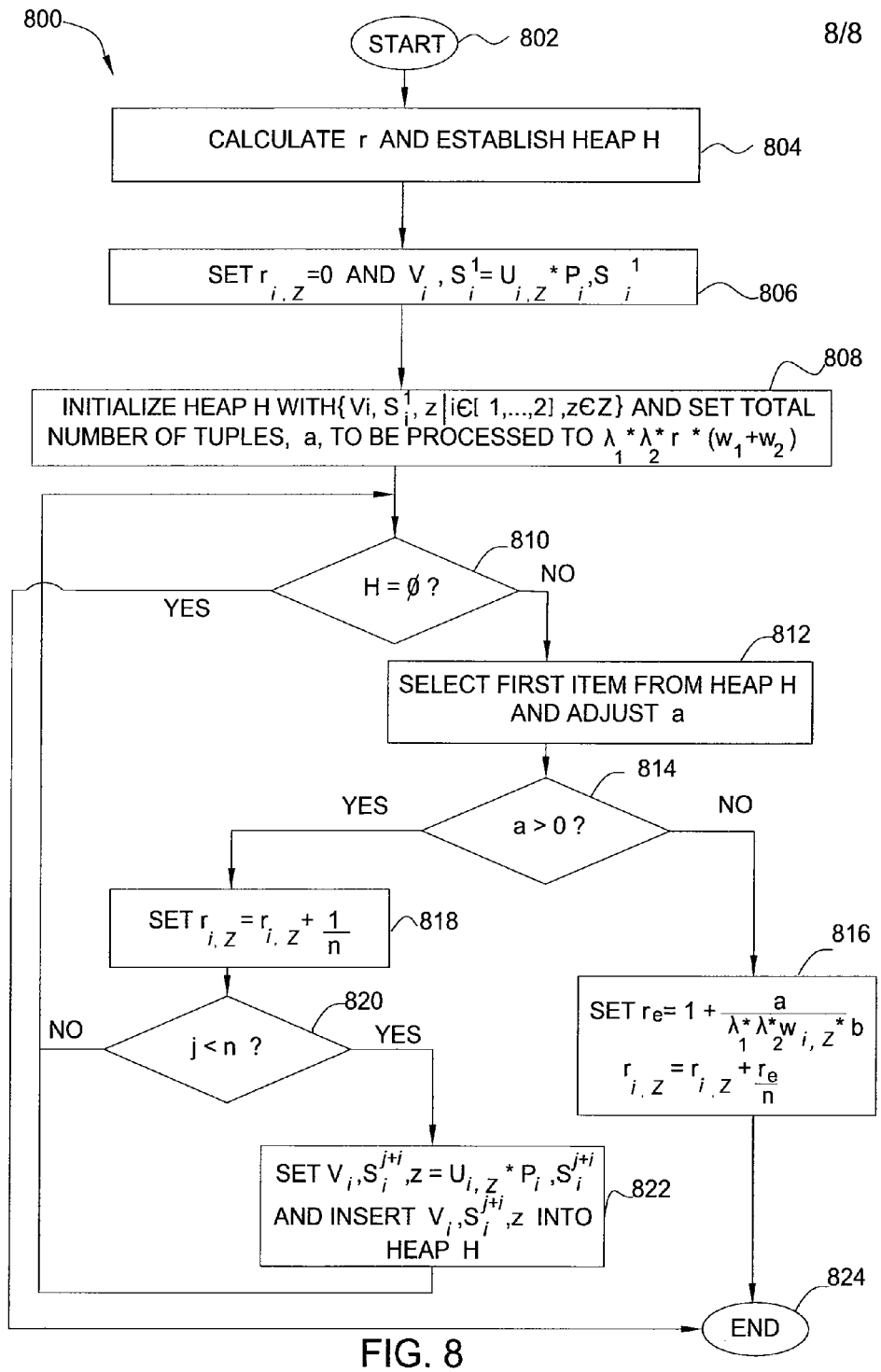
FIG. 8 is a flow diagram illustrating yet another embodiment of a method for selecting tuples for processing, in accordance with the method illustrated in FIG. 2.

FIG. 8 is a flow diagram illustrating one embodiment of a method 800 for selecting tuples for processing, e.g., in accordance with step 212 of the method 200. Specifically, the method 800 selects tuples for processing based not only on an optimal join direction, but also on the respective values of the tuples as discussed above.

The method 800 is initialized at step 802 and proceeds to step 804, where the method 800 calculates a fraction, r, of the tuples to be processed (e.g., in accordance with the method 300) and also establishes a heap, H.

The method 800 then proceeds to step 806 and sets an initial value of $r_{i,z}$ to zero and an initial value of $v_{i,s_i^1,z}$ to $u_{i,z} * p_{i,s_i^1}$, where $v_{i,s_i^1,z}$ is the value over volume ratio of the item $I_{i,s_i^1,z}$. In step 808, the method 800 initializes the heap, H, with $v_{i,s_i^1,z} | i \in [1, \ldots, 2]$, $z \in Z$ and sets the total number of tuples to be processed, $\alpha$, to $\alpha = \lambda_1 * \lambda_2 * r * (w_1 + w_2)$.

Once the heap, H, has been initialized and the number of tuples to be processed, $\alpha$, set, the method 800 proceeds to step 810 and inquires if the heap, H, is empty. If the method 800 concludes that the heap, H, is empty, the method 800 terminates in step 824.

Alternatively, if the method 800 determines in step 810 that the heap, H, is not empty, the method 800 proceeds to step 812 and selects the first (e.g., topmost) item from the heap, H. Moreover, based on the selection of the first item, the method 800 adjusts the total number of tuples, $\alpha$, that can still be processed. In one embodiment, the total number of tuples, $\alpha$, is now $\alpha - (w_{i,z} * \lambda_1 * \lambda_2 * b)$.

The method 800 then proceeds to step 814 and inquires if the adjusted value of $\alpha$ is still greater than zero. If the method 800 concludes that $\alpha$ is not greater than zero (e.g., no more tuples can be processed after subtracting the first item from the heap, H), the method 800 proceeds to step 816 and adjusts the fraction $r_e$ of the first available sub-window to be processed such that:

$$r_e = 1 + \frac{a}{\lambda_1 * \lambda_2 * w_{i,z} * b} \qquad \text{(EQN. 8)}$$

Moreover, the method 800 re-sets $r_{i,z}$ to $$r_{i,z} + \frac{r_e}{n}.$$

The method 800 then terminates in step 824.

Alternatively, if the method 800 determines in step 814 that $\alpha$ is greater than zero (e.g., tuples remain available for processing after subtracting the first item from the heap, H), the method 800 proceeds to step 818 and re-sets $r_{i,z}$ to $$r_{i,z} + \frac{1}{n}.$$

The method 800 then proceeds to step 820 and determines whether the current sub-window, j, from which the last processed item was taken is the last sub-window, n (e.g., whether j<n) in the sliding window under examination. If the current sub-window j is not the last sub-window, n (e.g., if j<n), then the method 800 proceeds to step 822 and sets $v_{i,s_i^{j+1},z} = u_{i,z} * p_{i,s_i^j}$ and inserts $v_{i,s_i^{j+1}}$ into the heap, H. The method 800 then returns to step 810 and proceeds as described above. Alternatively, if the method 800 determines in step 820 than the current sub-window, j, is the last sub-window, n (e.g., j=n), the method 800 bypasses step 822 and returns directly to step 810.

Thus, the present invention represents a significant advancement in the field of data stream processing. The present invention allows all incoming data streams to be received in memory, but selects only a subset of the tuples contained within the received data streams for processing, based on available processing resources and on one or more characteristics of the subset of tuples. The invention thus makes it possible for load shedding to be performed in an "intelligent" (e.g., non-arbitrary) manner, thereby maximizing the quality of the data stream operation output.

While foregoing is directed to the preferred embodiment of the present invention, other and further embodiments of the invention may be devised without departing from the basic scope thereof, and the scope thereof is determined by the claims that follow.

The invention claimed is:

1. A method for processing data streams, the method comprising:
   receiving at least a first data stream into at least a first sliding window of memory;
   selecting tuples from said at least said first data stream for processing in accordance with at least one data stream operation, where said tuples that are selected represent a subset of all tuples contained within said at least said first sliding window, wherein said selecting tuples from said at least said first data stream comprises:
      determining a total number of tuples to be selected for processing; and
      selecting specific tuples for processing in accordance with said total number of tuples, wherein said selecting specific tuples comprises:
         partitioning said at least said first sliding window into a first plurality of sub-windows;
         partitioning at least a second sliding window for receiving at least a second data stream into at least a second plurality of sub-windows;
         sorting said first plurality of sub-windows into a first prioritized array of sub-windows, wherein said tuples from said first data stream are sorted within said first prioritized array of sub-windows in a descending order based on a number of output tuples that each of said tuples from said first data stream is expected to produce when compared to a tuple from among tuples from said at least said second data stream;
         sorting said at least said second plurality of sub-windows into a second prioritized array of sub-windows, wherein said tuples from said second data stream are sorted within said second prioritized array of sub-windows in a descending order based on a number of output tuples that each of said tuples from said second data stream is expected to produce when compared to a tuple from among said tuples from said first data stream; and
      ignoring tuples from said at least said first data stream that are not selected for processing.

2. The method of claim 1, wherein said selecting specific tuples adapts to a time correlation between said tuples from said at least said first data stream and said tuples from at least said second data stream.

3. The method of claim 1, further comprising:
   joining at least one tuple from said first sliding window with at least one tuple from said second sliding window in accordance with said first prioritized array of sub-windows and said second prioritized array of sub-windows.

4. The method of claim 3, wherein said at least one tuple from said first sliding window is joined with said at least one tuple from said second sliding window until a total number of tuples processed substantially meets said total number of tuples to be selected for processing.

5. A computer readable storage device containing an executable program for processing data streams, where the program performs steps of:
   receiving at least a first data stream into at least a first sliding window of memory;
   selecting tuples from said at least said first data stream for processing in accordance with at least one data stream operation, where said tuples that are selected represent a subset of all tuples contained within said at least said first sliding window, wherein said selecting tuples from said at least said first data stream comprises:
      determining a total number of tuples to be selected for processing; and
      selecting specific tuples for processing in accordance with said total number of tuples, wherein said selecting specific tuples comprises:
         partitioning said at least said first sliding window into a first plurality of sub-windows;
         partitioning at least a second sliding window for receiving at least a second data stream into at least a second plurality of sub-windows;
         sorting said first plurality of sub-windows into a first prioritized array of sub-windows, wherein said tuples from said first data stream are sorted within said first prioritized array of sub-windows in a descending order based on a number of output tuples that each of said tuples from said first data stream is expected to produce when compared to a tuple from among tuples from said at least said second data stream;
         sorting said at least said second plurality of sub-windows into a second prioritized array of sub-windows, wherein said tuples from said second data stream are sorted within said second prioritized array of sub-windows in a descending order based on a number of output tuples that each of said tuples from said second data stream is expected to produce when compared to a tuple from among said tuples from said first data stream; and
      ignoring tuples from said at least said first data stream that are not selected for processing.

6. Apparatus comprising:
   an input device for receiving at least a first data stream into at least a first sliding window of memory;
   a processor for selecting tuples from said at least said first data stream for processing in accordance with at least one data stream operation, where said tuples that are selected represent a subset of all tuples contained within said at least said first sliding window, wherein said selecting tuples from said at least said first data stream comprises:
      determining a total number of tuples to be selected for processing; and
      selecting specific tuples for processing in accordance with said total number of tuples, wherein said selecting specific tuples comprises:
         partitioning said at least said first sliding window into a first plurality of sub-windows;
         partitioning at least a second sliding window for receiving at least a second data stream into at least a second plurality of sub-windows;
         sorting said first plurality of sub-windows into a first prioritized array of sub-windows, wherein said tuples from said first data stream are sorted within said first prioritized array of sub-windows in a descending order based on a number of output tuples that each of said tuples from said first data stream is expected to produce when compared to a tuple from among tuples from said at least said second data stream;
         sorting said at least said second plurality of sub-windows into a second prioritized array of sub-windows, wherein said tuples from said second data stream are sorted within said second prioritized array of sub-windows in a descending order based on a number of output tuples that each of said tuples from said second data stream is expected to produce when compared to a tuple from among said tuples from said first data stream; and wherein said processor is also for ignoring tuples from said at least said first data stream that are not selected for processing.

* * * * *